May 17, 1955     D. R. ZUCK     2,708,587
FOLDING BICYCLE

Filed June 20, 1951     4 Sheets-Sheet 1

INVENTOR.
Daniel R. Zuck

May 17, 1955   D. R. ZUCK   2,708,587
FOLDING BICYCLE
Filed June 20, 1951   4 Sheets-Sheet 3

INVENTOR.
Daniel R. Zuck

May 17, 1955

D. R. ZUCK 2,708,587

FOLDING BICYCLE

Filed June 20, 1951

INVENTOR.
Daniel R. Zuck

United States Patent Office 2,708,587
Patented May 17, 1955

2,708,587

FOLDING BICYCLE

Daniel R. Zuck, San Fernando, Calif.

Application June 20, 1951, Serial No. 232,611

11 Claims. (Cl. 280—278)

This invention relates to and has for its object the improvement of folding bicycles.

Another object of this invention is to provide a bicycle that can be folded easily without disassembly or separation of the frame into separate assemblies thereby facilitating handling of the folded bicycle and ease of stowage and transportation aboard airplanes, in automobiles, in boats, and storage and shelter in apartments, etc.

Another object of this invention is to provide a bicycle that can be folded easily into a package envelope approximately square and substantially in dimension a little greater than the diameter of one of its wheels.

Another object of this invention is to provide a bicycle that can be folded and unfolded easily and in a minimum time. Tests have shown that this bicycle herein disclosed can be folded in 20 seconds and unfolded and ready to ride in 10 seconds.

How the foregoing objects and advantages are secured, together with others which will occur to those skilled in the art, will be more apparent from the following description making reference to the accompanying drawings, in which—

Fig. 5 is a view taken on line 5—5 of Fig. 2 showing the latch which when released allows the front wheel fork to fold; and Fig. 6 is a view taken on line 6—6 of Fig. 2 showing the hinge line on which the front wheel fork assembly pivots when the fork is folded.

Figure 1:
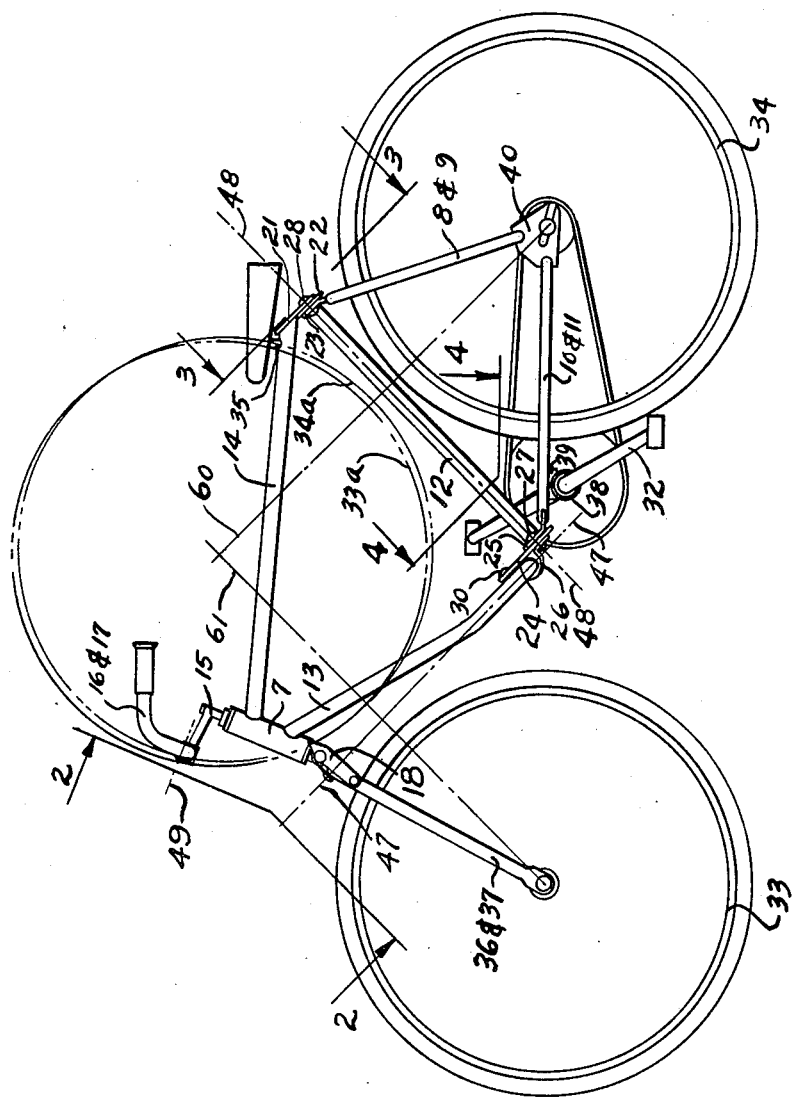
Fig. 1 is a side elevation view of a folding bicycle showing the position of the wheels in the unfolded and folded position.

As shown in Fig. 1 this folding bicycle consists substantially of a main frame body assembly, a rear wheel fork assembly, a front wheel fork assembly, and a handle bar assembly.

The rear wheel fork assembly consists of tube 12, tubes 8 and 9, tubes 10 and 11, pedal assembly 32, crank housing 38, crank hanger 39, lower folding pivot fitting 25, upper folding pivot fitting 23, and rear wheel hanger fitting 40.

The main frame body assembly consists of tube 14, tube 13, front fork bearing housing 7, seat post 35, upper folding hinge fitting 21, and lower folding hinge fitting 26.

The front wheel fork assembly consists of tube 36, tube 37, latch 18, front fork caster assembly 19, and tube 41.

The handle bar assembly consists of stem 15, center section 52, hinge fitting 51, hinge fitting 50, and handle bars 16 and 17.

Figure 2:
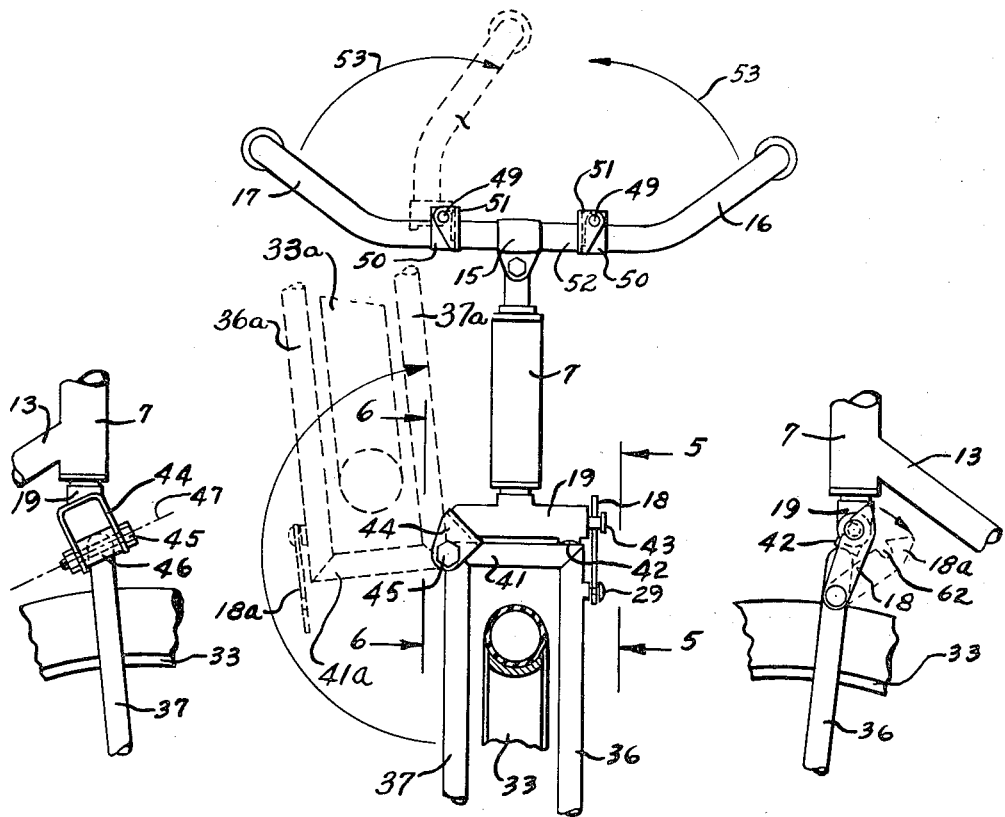
Fig. 2 is a view taken on the line 2—2 of Fig. 1 showing the folding of the handle bars and front wheel fork.
Figure 3:
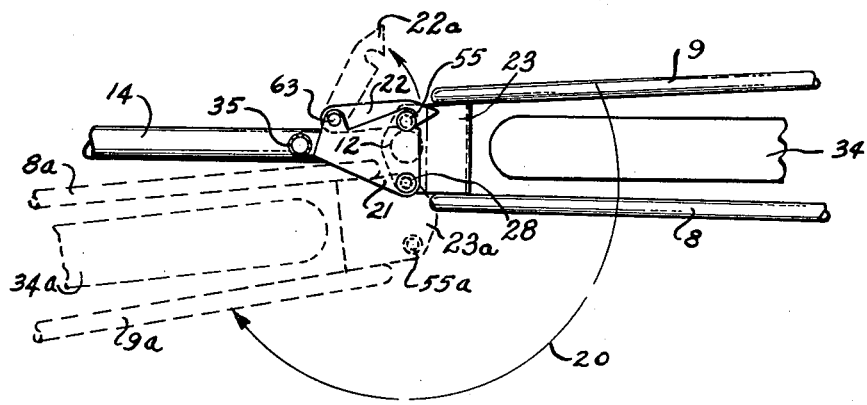
Fig. 3 is a view taken on line 3—3 of Fig. 1 showing the rear wheel fork assembly latched to the upper frame body in the unfolded position and unlatched and in the folded position as indicated by the broken lines.
Figure 4:
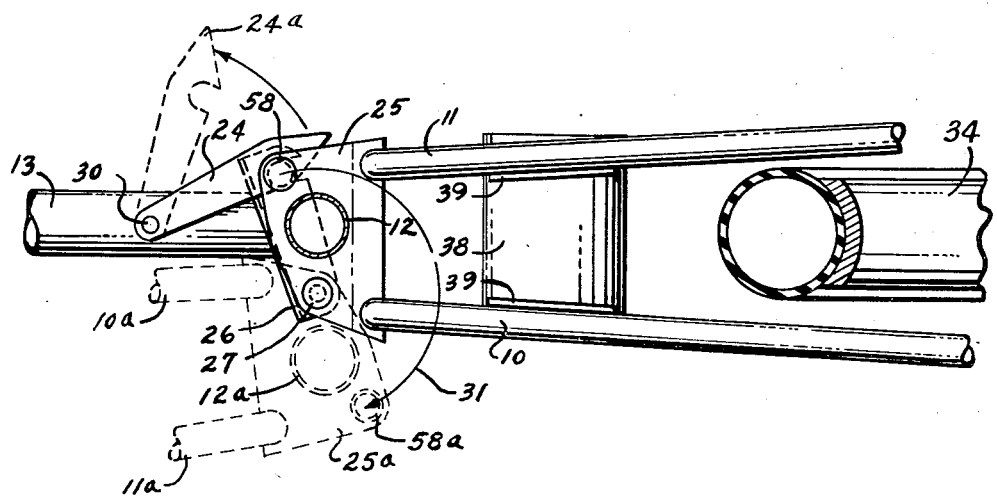
Fig. 4 is a view taken on line 4—4 of Fig. 1 showing the rear wheel fork assembly and lower frame body in the latched position and in the folded position as indicated by the broken lines.

The bicycle unfolded ready for riding appears as shown in Fig. 1 solid lines, Fig. 2 solid lines, Fig. 3 solid lines, Fig. 4 solid lines, Fig. 5 and Fig. 6.

To fold the bicycle the handle bars 16 and 17 are moved in the direction indicated by arrows 53, on pivot axis 49 in Fig. 2; latch 18, Fig. 5 is moved to position 18a about pintle 29, this frees flanged stud 43 on caster assembly 19 and front wheel and fork assembly, 41, 36, and 37 are free to pivot about pivot axis 47 on bolt 45 and hinge fitting 46, the front fork folded position is indicated by broken lines in Fig. 2, 36a, 37a, and 41a; latches 22 and 24 Fig. 1 are moved to position 22a and 24a about pintles 63 and 30 respectively in Figures 3 and 4, this frees the rear fork assembly to pivot on pivot axis 48 on hinge pins 27 and 28, the folded position of the rear fork assembly is indicated by broken lines 8a and 9a, 10a and 11a, and also indicated by arrows 20 and 31 in Figs. 3 and 4. Like members with the suffix "a" indicate the parts of the bicycle in their respective positions when the bicycle is folded.

Figure 3A:
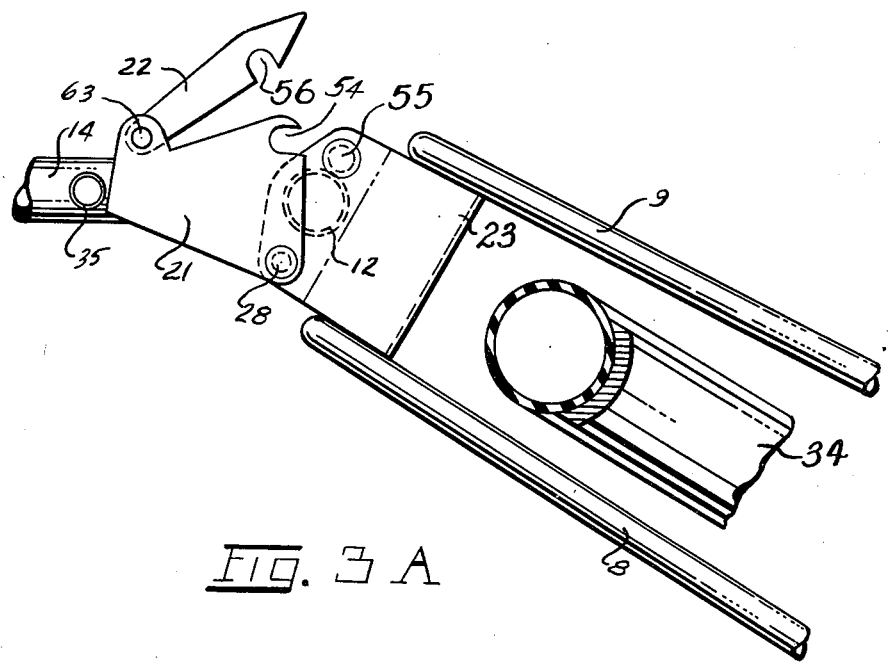
Fig. 3A is an enlarged view taken on line 3—3 of Fig. 1 showing the rear wheel fork assembly unlatched from the frame body.

As shown in Fig. 3A, fitting 21 has a slot 54 which receives flanged stud 55. Latch 22 also has a slot 56 which functions as a hook and which engages stud 55 when said stud 55 is rotated into slot 54. Latch 22 then securely locks the rear fork assembly to the upper main frame body in the unfolded position.

Figure 4A:
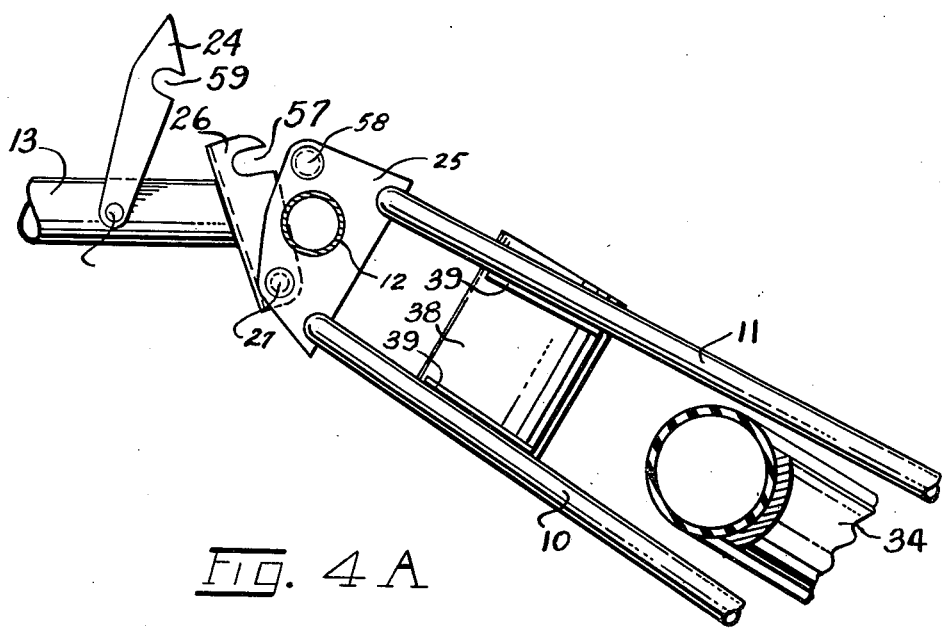
Fig. 4A is a view taken on line 4—4 of Fig. 1 showing the rear wheel fork assembly unlatched from the lower frame body.

Also, as shown in Fig. 4A, fitting 26 has a slot 57 which receives the flanged stud 58. Latch 24 also has a slot 59 which functions as a hook and which engages stud 58 when said stud 58 is rotated into slot 57. Latch 24 then securely locks the rear fork assembly to the lower main frame body in the unfolded position.

As shown in Fig. 5 the latch 18 has a slot 62 which engages stud 43 and holds the front fork assembly securely locked against bumper 42 in the unfolded position.

The centerline of the axle of the rear wheel travels on a plane designated by line 60, Fig. 1 when the rear wheel fork assembly is rotated toward the folded position about pivot axis 48.

The centerline of the axle of the front wheel travels on the plane designated by line 61, Fig. 1 when the front fork assembly is rotated toward the folded position about pivot axis 47.

In the folded position the front wheel occupies the position at 33a, and the rear wheel occupies the position at 34a, Fig. 1, adjacent each other with the frame body, the folded handle bars, and the seat nested between the front and rear wheels.

The essence of compactly folding this bicycle is the angular interrelation of the folding pivot axes 47 and 48 of the front and rear fork assemblies. This angle on the bicycle of Fig. 1 is substantially 90 degrees, said angle need not necessarily be 90 degrees to accomplish the object which I have demonstrated.

Locking means are anticipated, but are not shown, to hold handle bars 16 and 17 in the unfolded position. This lock may be similar to latch 18 or a spring lock which would be pivoted on the handle bar and the latch would engage a stud which would be anchored in 52 center section thereby locking handle bars 16 and 17 to 52.

A tight friction fit with closely controlled tolerances in the manufacture of the latches 18, 22, and 24 and the associated mating parts has proved adequate to maintain these latches in the locked position. In the manufacture of latches 18, 22, and 24 a very slight interference at the start of engagement with the studs 43, 55, and 58 may be used to further ensure retaining of the latches in the locked position when the bicycle is unfolded.

Many variations may be effected without departing from the spirit of my invention. It is to be understood that these, together with other variations in details, are anticipated by the appended claims.

What I claim is:

1. A bicycle assembly consisting of a folding rear wheel fork assembly, a frame body assembly, and a folding front wheel fork assembly, the folding rear wheel fork assembly consisting of a lower fork assembly supporting a pedal crank housing and an upper fork assembly attached to a spreader member extending between the upper and lower fork assemblies, an upper hinging member attached to the frame body assembly and to the spreader member adjacent the rider's seat support, and a lower hinging member attached to the frame body assembly and to the spreader member forward of the pedal crank housing to provide a hinging axis to fold the rear wheel fork assembly, the hinging axis being outboard of a centerline extending longitudinally through the frame body assembly, said folding front wheel fork assembly consisting of a wheel fork assembly and a hinging member above the wheel and outboard from said centerline and on the opposite side of said centerline from that of the folding hinge axis of the folding rear wheel fork assembly, said front fork hinging member permitting the front wheel fork assembly to fold on an axis substantially 90 degrees to the folding axis of the rear wheel fork assembly, permitting the front and rear wheel to fold substantially side by side with the frame body assembly between the wheels.

2. A folding bicycle as in claim 1 provided with articulated latches consisting of hooks which engage mating studs adjacent the folding hinge axes of the front and rear fork assemblies.

3. A folding bicycle as in claim 2 provided with folding handle bars on the frame assembly which fold on two pivot axes parallel to and disposed on opposite sides of said centerline.

4. A folding bicycle assembly consisting of a folding rear wheel fork assembly, a frame body assembly, and a folding front wheel fork assembly, the rear wheel fork assembly provided with a pedal crank housing and having a folding hinge axis adjacent and forward of the pedal crank housing and outboard of the wheel centerline and vertically slanted aft and adjacent the rider's seat support, a lower pintle on said folding hinge axis and an upper pintle on said folding hinge axis connecting the rear wheel fork assembly to the frame body assembly, the frame body assembly being connected to a front wheel fork assembly having a folding hinge axis substantially 90 degrees to the folding hinge axis of the rear wheel fork assembly, the front wheel fork assembly folding hinge axis being outboard of the wheel centerline opposite from the rear wheel fork assembly folding hinge axis, the said front wheel fork assembly folding hinge axis having a hinging element on the fork above the wheel and below the frame body assembly, permitting the front wheel fork assembly and rear wheel fork assembly to fold side by side with the frame body assembly between the wheels.

5. A folding bicycle as in claim 4 provided with articulated latches consisting of hooks which engage mating studs adjacent the folding hinge axes of the front and rear fork assemblies.

6. A folding bicycle as in claim 5 provided with folding handle bars on the frame body assembly which fold on two pivot axes parallel to the front wheel plane, said folding pivot axes of the handle bars limiting the folding direction of the handle bars to an upward rotation and providing the handle bar outer segments with substantial alignment with the inner connecting segment.

7. A bicycle assembly consisting of a front wheel fork assembly, a frame body assembly, and a rear wheel fork assembly provided with a pedal crank housing, the rear wheel fork assembly having a lower folding hinge forward of the pedal crank housing attaching the lower end of the rear fork assembly to the frame body assembly and an upper folding hinge adjacent and aft of the rider's seat support attaching the upper end of the rear fork assembly to the frame body assembly, the front wheel fork assembly having a folding hinge above the wheel and below the frame body assembly having a hinge axis at such an angle to the hinge axis of said rear fork assembly folding hinge to permit the front and rear wheels to fold substantially side by side with the frame body assembly between the wheels.

8. A folding bicycle as in claim 7 provided with articulated latches consisting of hooks which latch into mating receptacles adjacent the folding hinge axes of the front and rear fork assemblies to lock the bicycle in the unfolded configuration and to permit the bicycle to be folded when the latches are released.

9. A folding bicycle as in claim 8 provided with folding handle bars on the frame body assembly which fold on two pivot axes parallel to the front wheel plane, said folding pivot axes of the handle bars limiting the folding direction of the handle bars to an upward rotation only and providing the handle bar outer segments with substantial alignment with the inner connecting segment.

10. A bicycle assembly consisting of a front wheel fork assembly, a frame body assembly, and a rear wheel fork assembly provided with a pedal crank housing, the rear wheel fork assembly having a folding hinge axis on a line forward of the pedal crank housing and vertically slanting aft of and adjacent the rider's seat support, and the front wheel fork assembly having a folding hinge axis substantially 90 degrees to the said rear wheel fork assembly folding hinge axis, said front fork folding hinge axis having folding hinge elements above the front wheel and below the frame body assembly, the hinge axes being located on opposite sides of the longitudinal centerline of the frame body assembly and permitting the front wheel and rear wheel to fold substantially side by side with the frame body assembly between the wheels.

11. A bicycle assembly consisting of a folding rear wheel fork assembly, a frame body assembly, and a folding front wheel fork assembly, the folding rear wheel fork assembly consisting of a lower fork assembly supporting a pedal crank housing, a spreader member vertically slanting aft and originating forward of the pedal crank housing and intersecting the lower fork assembly and lower frame body assembly member at a structural point of construction, an upper fork assembly of the said rear wheel fork assembly intersecting the upper end of the said spreader member and the upper member of the frame body assembly at a structural point of construction aft of the rider's seat support, hinge fittings at the structural points of construction formed by the intersection of the centerlines of the members at the upper and lower extremities of the spreader member, said hinge fittings provided with folding hinge axes outboard of the centerline of the rear wheel plane, latching means outboard of the said rear wheel centerline opposite from the said hinge axes to permit the bicycle to be folded or locked in the unfolded configuration, a folding front wheel fork assembly consisting of a fork, a hinge fitting on the fork above the wheel and located outboard from the wheel centerline and on the opposite side from the rear wheel fork assembly folding hinge axis, the said front wheel fork holding hinge fitting connected to a caster element engaging the frame body assembly for steering the bicycle, latching means outboard from the centerline and opposite from the said front fork folding hinge to secure the front fork in the unfolded position and permitting the front and rear wheels to fold substantially side by side with the frame body assembly between the wheels.

References Cited in the file of this patent

UNITED STATES PATENTS

| | | |
|---|---|---|
| 1,584,314 | Mamiya | May 11, 1926 |

FOREIGN PATENTS

| | | |
|---|---|---|
| 195,205 | Switzerland | June 1, 1938 |
| 202,044 | Germany | Sept. 24, 1908 |
| 543,076 | Great Britain | Feb. 9, 1942 |
| 893,184 | France | June 1, 1944 |